US008218958B2

(12) United States Patent
Sato

(10) Patent No.: US 8,218,958 B2
(45) Date of Patent: *Jul. 10, 2012

(54) OPTICAL APPARATUS INCLUDING AN IMAGE STABILIZING APPARATUS

(75) Inventor: Shigeki Sato, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/164,253

(22) Filed: Jun. 20, 2011

(65) Prior Publication Data

US 2011/0249336 A1   Oct. 13, 2011

Related U.S. Application Data

(63) Continuation of application No. 12/836,158, filed on Jul. 14, 2010, now Pat. No. 8,086,097.

(30) Foreign Application Priority Data

Jul. 14, 2009   (JP) ................................ 2009-165538

(51) Int. Cl.
*G03B 17/00* (2006.01)
*G02B 27/64* (2006.01)

(52) U.S. Cl. ...................... 396/55; 348/208.99; 359/557

(58) Field of Classification Search ............. 348/208.99, 348/208.7–208.11; 359/554–557; 396/52–55
See application file for complete search history.

(56) References Cited

U.S. PATENT DOCUMENTS

| | | | |
|---|---|---|---|
| 5,835,799 A | 11/1998 | Washisu | |
| 5,870,634 A | 2/1999 | Sugaya et al. | |
| 5,926,656 A | 7/1999 | Imura et al. | |
| 6,035,131 A | 3/2000 | Washisu | |
| 6,064,827 A | 5/2000 | Toyoda | |
| 6,415,105 B1 | 7/2002 | Sasaki | |
| 7,379,093 B2* | 5/2008 | Seo | 348/208.4 |
| 2006/0070302 A1* | 4/2006 | Seo | 52/6 |
| 2006/0204233 A1* | 9/2006 | Miyamoto | 396/55 |
| 2006/0285839 A1 | 12/2006 | Tomita | |
| 2007/0257989 A1* | 11/2007 | Shirono | 348/208.99 |

(Continued)

FOREIGN PATENT DOCUMENTS

JP   10-197911 A   7/1998

(Continued)

*Primary Examiner* — Mark Consilvio
(74) *Attorney, Agent, or Firm* — Rossi, Kimms & McDowell LLP

(57) ABSTRACT

An image stabilizer includes: an optical system movable in a plane perpendicular to an optical axis ("orthogonal plane") and correcting image blur; a movable member holding the optical system and movable relative to a fixed member in an orthogonal plane; a guide guiding the movable member while preventing from rotating in an orthogonal plane; three first balls rollably interposed between the fixed and guide members; two second balls rollably interposed between the guide and movable members; one third ball rollably interposed between the fixed and movable members; a biasing unit biasing the movable member toward the fixed member; and a drive unit driving the movable member relative to the fixed member in two directions perpendicular to the optical axis, wherein in an orthogonal plane, two of the first balls are rollable only in first direction; the second balls are rollable only in second direction different from the first direction.

12 Claims, 12 Drawing Sheets

U.S. PATENT DOCUMENTS

| | | | |
|---|---|---|---|
| 2008/0085108 A1* | 4/2008 | Sekino et al. | 396/55 |
| 2008/0181594 A1 | 7/2008 | Noguchi | |
| 2009/0002500 A1* | 1/2009 | Kawai et al. | 348/208.11 |
| 2009/0059372 A1* | 3/2009 | Kawauchi et al. | 359/554 |
| 2010/0157074 A1* | 6/2010 | Kawai et al. | 348/208.7 |
| 2011/0013283 A1* | 1/2011 | Sato | 359/557 |
| 2011/0050921 A1* | 3/2011 | Noto | 348/208.7 |

FOREIGN PATENT DOCUMENTS

| | | |
|---|---|---|
| JP | 2004-101721 A | 4/2004 |
| JP | 2008-185643 A | 8/2008 |
| JP | 2010-276973 A | 12/2010 |

* cited by examiner

OPTICAL APPARATUS INCLUDING AN IMAGE STABILIZING APPARATUS

CROSS REFERENCE TO RELATED APPLICATION

This is a continuation of and claims priority from U.S. patent application Ser. No. 12/836,158 filed Jul. 14, 2010, the content of which is incorporated herein by reference.

BACKGROUND OF THE INVENTION

1. Field of the Invention

The present invention relates to an optical apparatus including an image stabilizing apparatus which detects vibration (shaking) generated in the optical apparatus or the like, and causes a lens (image stabilizing unit) to move in a direction perpendicular to an optical axis while detection of the vibration is used as information for image blur correction, to thereby correct an image blur.

2. Description of the Related Art

In a camera, nowadays, because operations such as exposure determination and focusing important for photographing are all automated, a risk that those unskilled in camera operation may fail in photographing has been greatly reduced. In addition, in recent years, studies have been conducted on a system which corrects an image blur caused by shaking applied to the camera. Accordingly, there are now almost no factors to cause photographers to fail in photographing.

Here, the system that corrects the image blur caused by shaking is described briefly.

Shaking of the camera during photographing is normally a vibration with a frequency of from 1 Hz to 12 Hz. In order to enable photographing free of the image blur even when the shaking occurs at the time of shutter release operation, basically, a camera vibration due to the shaking must be detected, and then a correction lens must be displaced according to the detection value. Therefore, in order to enable photographing free of the image blur even when the shaking occurs, first, it is necessary to detect the camera vibration accurately. Second, it is necessary to correct an optical axis change caused by the camera vibration through displacing the correction lens.

In principal, detection of the vibration (shaking) can be performed through installing into the camera a vibration detecting unit for detecting acceleration, angular velocity, or the like, and a camera shake detecting unit for electrically integrating a signal output from the vibration detecting unit and outputting displacement. Through controlling the image stabilizing unit which is installed in the image stabilizing apparatus to displace the correction lens based on the detected information and to change the optical axis in photographing, the image blur correction can be performed.

Here, an outline of an image stabilizing system is described, which uses a shake detecting unit and suppresses an image blur caused by vertical camera shake (pitch direction) and lateral camera shake (yaw direction).

The image stabilizing system includes a lens barrel, the shake detecting unit for detecting the vertical camera shake and the lateral camera shake, a image stabilizing optical unit, a coil for imparting a thrust force to the image stabilizing optical unit, and a detection element for detecting a position of the image stabilizing optical unit. The image stabilizing optical unit is driven by an electromagnetic actuator formed of a coil and a magnet. Further, the image stabilizing optical unit includes a position control loop, and is driven while using output of the shake detecting unit as a target value, to thereby secure stability in imaging position on an image plane.

Further, in the image stabilizing apparatus, there is often provided a rolling prevention structure for moving the image stabilizing optical unit only in the pitch direction and the yaw direction to prevent the image stabilizing apparatus from being rotated. This is because, when rolling occurs besides movement in the pitch direction and the yaw direction, a position detecting unit detects a moving amount different from an actual blur correction amount to perform false correction based on a false signal such as so-called crosstalk, with the result that precise image blur correction cannot be performed.

The applicant of the present invention also has already proposed the following structure as the rolling prevention structure.

In Japanese Patent Application Laid-Open No. H10-197911, there is proposed an optical image stabilizing apparatus in which rotation of a correction lens about the optical axis is prevented with use of an L-shaped guide shaft. However, in the optical image stabilizing apparatus disclosed in Japanese Patent Application Laid-Open No. H10-197911, a guide mechanism for preventing rotation of the correction lens about the optical axis is configured to guide the correction lens so that the correction lens parallelly moves while sliding. Therefore, there is a problem in that sliding friction generated in the guide mechanism deteriorates driving responsibility during, in particular, micro driving of the correction lens.

In this context, in Japanese Patent Application Laid-Open No. 2004-101721, there is disclosed an optical image stabilizing apparatus in which rotation of a correction lens about the optical axis is suppressed with use of rollable balls. The optical image stabilizing apparatus includes a guide member having V-shaped groove portions formed in both surfaces thereof and extending in directions orthogonal to each other. In addition, the optical image stabilizing apparatus includes balls (steel balls) arranged in the V-shaped groove portions on one surface of the guide member to be interposed between the guide member and a base member of the optical image stabilizing apparatus, and balls arranged in the V-shaped groove portions on the other surface of the guide member to be interposed between the guide member and a lens holding member for holding the correction lens.

Similarly, a rolling prevention structure using rolling balls is disclosed in Japanese Patent Application Laid-Open No. 2008-185643. Owing to the rolling prevention structure, rolling can be reliably prevented even when high-frequency vibration is generated or a large external force is applied.

In each of Japanese Patent Application Laid-Open No. 2004-101721 and Japanese Patent Application Laid-Open No. 2008-185643, the rolling prevention structure using rolling balls is proposed. The rolling balls and the guide member serving as the rolling prevention structure are overlaid in an optical axis direction. Further, biasing units provided to obtain a rolling prevention effect owing to the rolling balls are arranged to be opposed to each other through a rolling prevention structure section and an image stabilizing unit. Thus, the image stabilizing apparatus itself is enlarged in size in the optical axis direction, and imposes restrictions on optical designing. Further, a large number of components are overlaid on a fixed member, and hence it is essential to increase dimensional accuracy of each component in order to obtain positional accuracy in the optical axis direction of an image stabilizing optical system, which is disadvantageous in terms of manufacturing cost of the components.

Further, in an embodiment of Japanese Patent Application Laid-Open No. 2008-185643, the image stabilizing optical system of the image stabilizing apparatus is supported in the optical axis direction by rolling balls other than rolling balls serving as the rolling prevention structure, and hence the positional accuracy in the optical axis direction is easily obtained. However, no fewer than nine rolling balls are required, and the biasing units and the rolling prevention structure are arranged to be overlaid on each other in the optical axis direction. Thus, there is a problem in that the image stabilizing apparatus itself is further enlarged in size in the optical axis direction. Further, a large number of components are required, and hence there is a problem in assembling property.

The present invention has been made in view of the above-mentioned problems, and therefore it is an object of the present invention to provide an optical apparatus including an image stabilizing apparatus in which the rolling prevention structure is formed of rolling balls so that the image stabilizing apparatus guides a lens with less frictional resistance and has a compact configuration, and in which the assembling property is improved, and the positional accuracy in the optical axis direction of the image stabilizing optical system is increased.

SUMMARY OF THE INVENTION

In order to achieve the above-mentioned object, according to a first aspect of the present invention, there is provided an image stabilizing apparatus, including: an optical system that moves in a plane perpendicular to an optical axis and corrects an image blur; a movable member that holds the optical system and is movable with respect to a fixed member in the plane perpendicular to the optical axis; a guide member that guides the movable member to prevent the movable member from rotating in the plane perpendicular to the optical axis; three first rolling balls rollably interposed between the fixed member and the guide member; two second rolling balls rollably interposed between the guide member and the movable member; one third rolling ball rollably interposed between the fixed member and the movable member; a biasing unit that biases the movable member in a direction toward the fixed member; and a drive unit that drives the movable member with respect to the fixed member in two directions perpendicular to the optical axis, in which: two of the first rolling balls are rollable only in a first direction perpendicular to the optical axis; and the second rolling balls are rollable only in a second direction that is perpendicular to the optical axis and is different from the first direction.

According to a further aspect of the present invention, in the image stabilizing apparatus, when projected onto a plane perpendicular to the optical axis, a line connecting portions, in which the two second rolling balls abut against the guide member, intersects, at two points, a triangle formed by connecting portions, in which the three first rolling balls abut against the guide member. With this configuration, despite the fact that the guide member is biased at two points in the direction of the first rolling balls, the guide member is biased in a stable state in the direction of the first rolling balls. Further, the third rolling ball is caused to abut directly against the fixed member. Thus, positional accuracy in the optical axis direction of the image stabilizing unit can be increased, and the image stabilizing apparatus is allowed to have a compact configuration in the optical axis direction.

According to a further aspect of the present invention, in the image stabilizing apparatus, the second rolling balls and the third rolling ball are arranged equiangularly in a rotating direction about the optical axis, and the guide member is formed of a plate-like nonmagnetic material. Abutting portions in which the first rolling balls and the second rolling balls abut against the guide member are arranged at positions different from each other in the rotating direction about the optical axis, abutting portions in which the two of the first rolling balls rollable only in the first direction abut against the guide member and the fixed member include guide grooves extended in the first direction, and abutting portions in which the second rolling balls abut against the movable member and the fixed member include guide grooves extended in the second direction. As a result, the rolling balls themselves are arranged to overlap each other in the optical axis direction. With this configuration, the image stabilizing apparatus is allowed to have a compact configuration in the optical axis direction.

In addition, in the image stabilizing apparatus according to the present invention, the drive unit includes a yoke formed of a magnetic material magnetically coupled to a magnet, and is fixed integrally with the fixed member, and the yoke includes abutting portions in which the third rolling ball and at least two of the first rolling balls abut against the fixed member. As a result, the positional accuracy in the optical axis direction can be increased without increasing the number of components. Moreover, the biasing unit includes three biasing sub-units and the three biasing sub-units are arranged at the same position as a position of the second rolling balls and the third rolling ball in the rotating direction about the optical axis. Thus, the image stabilizing apparatus is allowed to have a compact configuration in the optical axis direction.

Further, the image stabilizing apparatus includes a tilt adjusting mechanism that adjusts tilt of an optical axis with respect to an optical apparatus. Thus, it is possible to configure the optical apparatus which includes the image stabilizing apparatus, corrects the tilt of the image stabilizing unit, and does not affect optical performance.

According to the present invention, the image stabilizing apparatus is allowed to have a compact configuration in the optical axis direction, and is allowed to move a lens holding member with less frictional resistance in an arbitrary direction in the plane perpendicular to the optical axis while restricting rotation of the lens holding member in the plane perpendicular to the optical axis. Therefore, it is possible to improve driving responsibility and image stabilizing performance, and to realize the image stabilizing apparatus and the optical apparatus with less vibration and noise.

Further features of the present invention will become apparent from the following description of exemplary embodiments with reference to the attached drawings.

DESCRIPTION OF THE EMBODIMENTS

An exemplary embodiment for carrying out the present invention is described with reference to the following embodiment.

Embodiment

Figure 1:
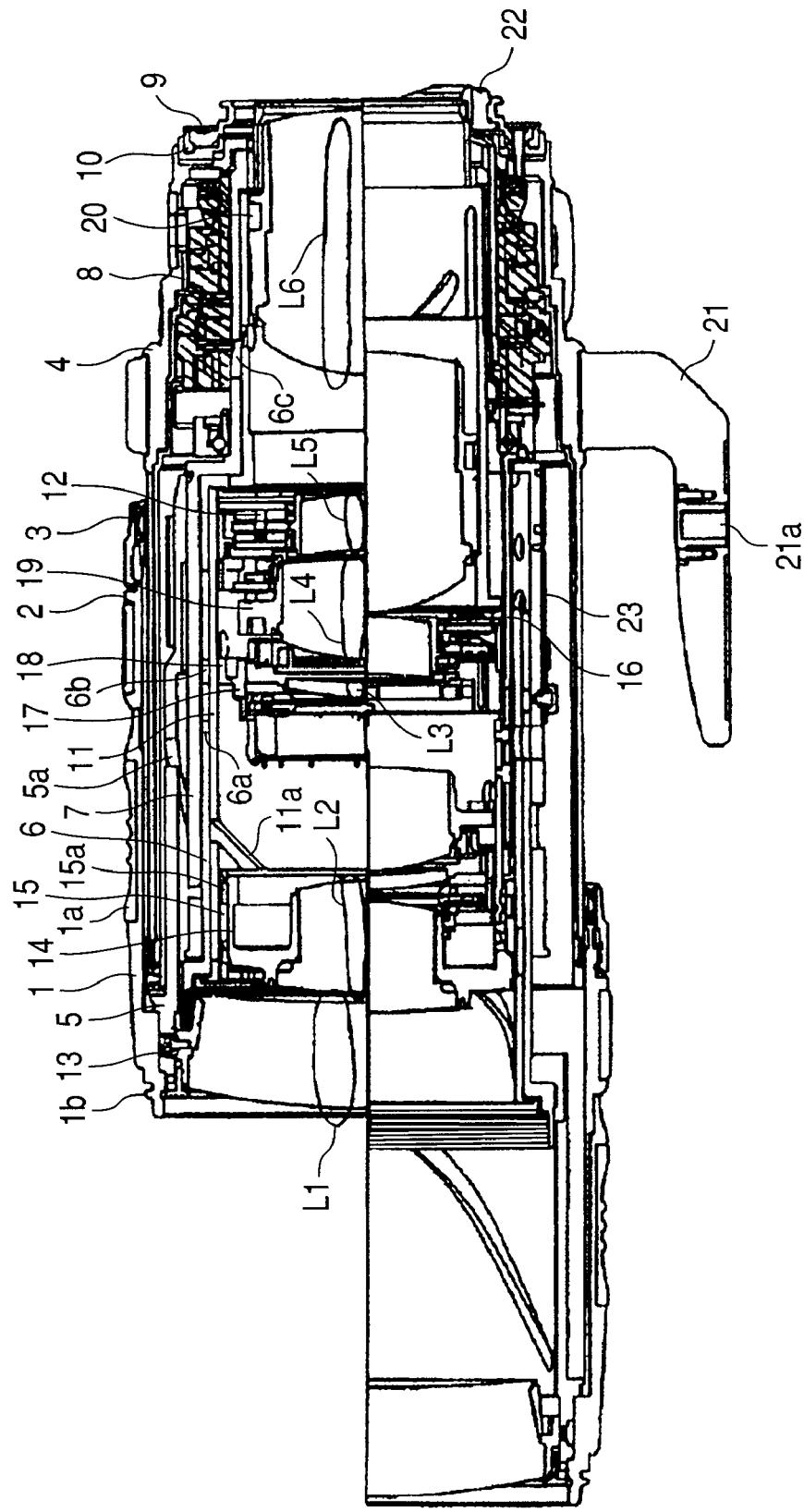
FIG. 1 is a sectional view of a lens barrel according to an embodiment of the present invention.

FIG. 1 illustrates a configuration of a lens apparatus as an optical apparatus according to the embodiment of the present invention. The lens apparatus is an interchangeable lens (zoom lens) for a single-lens reflex camera. An upper side with respect to a center line of FIG. 1 illustrates a configuration of the lens apparatus at a wide angle end, and a lower side with respect to the center line of FIG. 1 illustrates a configuration of the lens apparatus at a telephoto end. Note that, in the following description, an object side is referred to as a front side, and an image side is referred to as a back side.

An image pickup optical system includes a first lens unit L1 to a sixth lens unit L6. Through a translation operation of a zoom operation ring 1, the first lens unit L1 to the sixth lens unit L6 move in an optical axis direction, and change a focal length of the image pickup optical system. In order to facilitate the operation, a rubber ring 1a is attached onto an outer periphery of the zoom operation ring 1. Further, a claw portion 1b to which a light shielding hood is attached is provided at a front end portion of the zoom operation ring 1.

A focus operation ring 2 and a zoom operation adjusting ring 3 are arranged at a back end portion of the zoom operation ring 1. Through a rotating operation of the focus operation ring 2, the second lens unit L2 moves in the optical axis direction, and thus it is possible to perform focus adjustment. Further, through a rotating operation of the zoom operation adjusting ring 3, magnitude of friction between the zoom operation adjusting ring 3 and a fixed barrel 4 arranged inside the zoom operation adjusting ring 3 is changed, and thus it is possible to adjust load in the operation of the zoom operation ring 1.

A translating lens barrel 5 moves in the optical axis direction together with the zoom operation ring 1 and a first lens barrel 13 holding the first lens unit L1. The translating lens barrel 5 is provided with a cam 5a. A zoom cam ring 6 is provided with a cam follower (not shown) that is engaged to the cam 5a of the translating lens barrel 5. Therefore, through the translation operation of the zoom operation ring, the zoom cam ring 6 moves in the optical axis direction while rotating, and causes each lens unit to move in the optical axis direction.

Here, a moving amount in the optical axis direction of the zoom cam ring 6 is the same as a moving amount in the optical axis direction of an image stabilizing apparatus (optical image stabilizing apparatus) including the fifth lens unit L5, which is described below.

The image stabilizing apparatus 12 is fixed to a fifth moving barrel 11. A follower (not shown) provided to the fifth moving barrel 11 is engaged to a groove portion (not shown) that is formed in the zoom cam ring 6 to extend in a circumferential direction thereof. Accordingly, the image stabilizing apparatus 12 (fifth lens unit L5) moves in the optical axis direction together with the zoom cam ring 6 without rotating.

A guide barrel 7 constitutes a stationary part of the lens apparatus. In a back portion of the guide barrel 7, there are held a vibration-type motor and a focus unit 8 including a transmission mechanism for transmitting rotation of the vibration-type motor and rotation of the focus operation ring 2 to a focus key 16. Further, the fixed barrel 4 and a mount 9 are fixed at a back end portion of the guide barrel 7 with screws.

In a state in which the mount 9 is installed to a mount of a camera (not shown), a drip-proof rubber 10 prevents drips of water from getting into a portion to which the mount is coupled.

A second lens barrel 14 holds the second lens unit L2. A focus cam ring 15 arranged on an outer periphery of the second lens barrel 14 includes a cam follower (not shown) that is engaged to a guide groove portion (not shown) formed in the zoom cam ring 6 to extend in the optical axis direction and to a cam groove portion 11a formed in the fifth moving barrel 11. Therefore, when the zoom cam ring 6 rotates, the focus cam ring 15 moves in the optical axis direction while rotating, and the second lens barrel 14 (second lens unit L2) moves in the optical axis direction together with the focus cam ring 15 without rotating.

Rotation of the above-mentioned focus key 16 is transmitted to the second lens barrel 14. The second lens barrel 14 rotates with respect to the focus cam ring 15, and thus the second lens barrel 14 moves in the optical axis direction to perform focus adjustment by a focus cam 15a formed on an inner periphery of the focus cam ring 15. Note that, in the image pickup optical system in this embodiment, a moving amount of the second lens unit L2 for focus adjustment is varied depending on the focal length. Therefore, the focus cam ring 15 is rotated according to a change in focal length, and a use range of the focus cam 15a for moving the second lens barrel 14 in the optical axis direction is changed. As a result, the moving amount of the second lens barrel 14 is varied.

A third lens barrel 18 holds the third lens unit L3. A stop unit 17 is fixed to a front portion (front side with respect to the third lens unit L3) of the third lens barrel 18. The third lens barrel 18 includes a cam follower (not shown) that is engaged to a cam groove portion 6a formed in the zoom cam ring 6 and to a translation groove portion (not shown) formed in the fifth moving barrel 11. Therefore, when the zoom cam ring 6 rotates, the third lens barrel 18 (third lens unit L3) and the stop unit 17 move in the optical axis direction.

A fourth lens barrel 19 holds the fourth lens unit L4. The fourth lens barrel 19 includes a cam follower (not shown) that is engaged to a cam groove portion 6b formed in the zoom cam ring 6 and to a translation groove portion (not shown) formed in the fifth moving barrel 11. Therefore, when the zoom cam ring 6 rotates, the fourth lens barrel 19 (fourth lens unit L4) moves in the optical axis direction.

A sixth lens barrel 20 holds the sixth lens unit L6. The sixth lens barrel 20 includes a cam follower (not shown) that is engaged to a cam groove portion 6c formed in the zoom cam ring 6 and to a translation groove portion (not shown) formed in the guide barrel 7. Therefore, when the zoom cam ring 6 rotates, the sixth lens barrel 20 (sixth lens unit L6) moves in the optical axis direction.

A tripod pedestal 21 includes a threaded portion 21a for fixing the lens apparatus to a tripod.

A control circuit 23 of the lens apparatus is arranged so as to surround an outer periphery of the guide barrel 7. A vibration sensor (angular velocity sensor), such as a vibratory gyroscope, for detecting vibration of the lens apparatus is soldered to the control circuit 23, and is fixed to the guide barrel 7 through a rubber.

Further, the control circuit 23, the focus unit 8, the image stabilizing apparatus 12, and the stop unit 17 are electrically connected to the camera at contact points 22.

Figure 2:
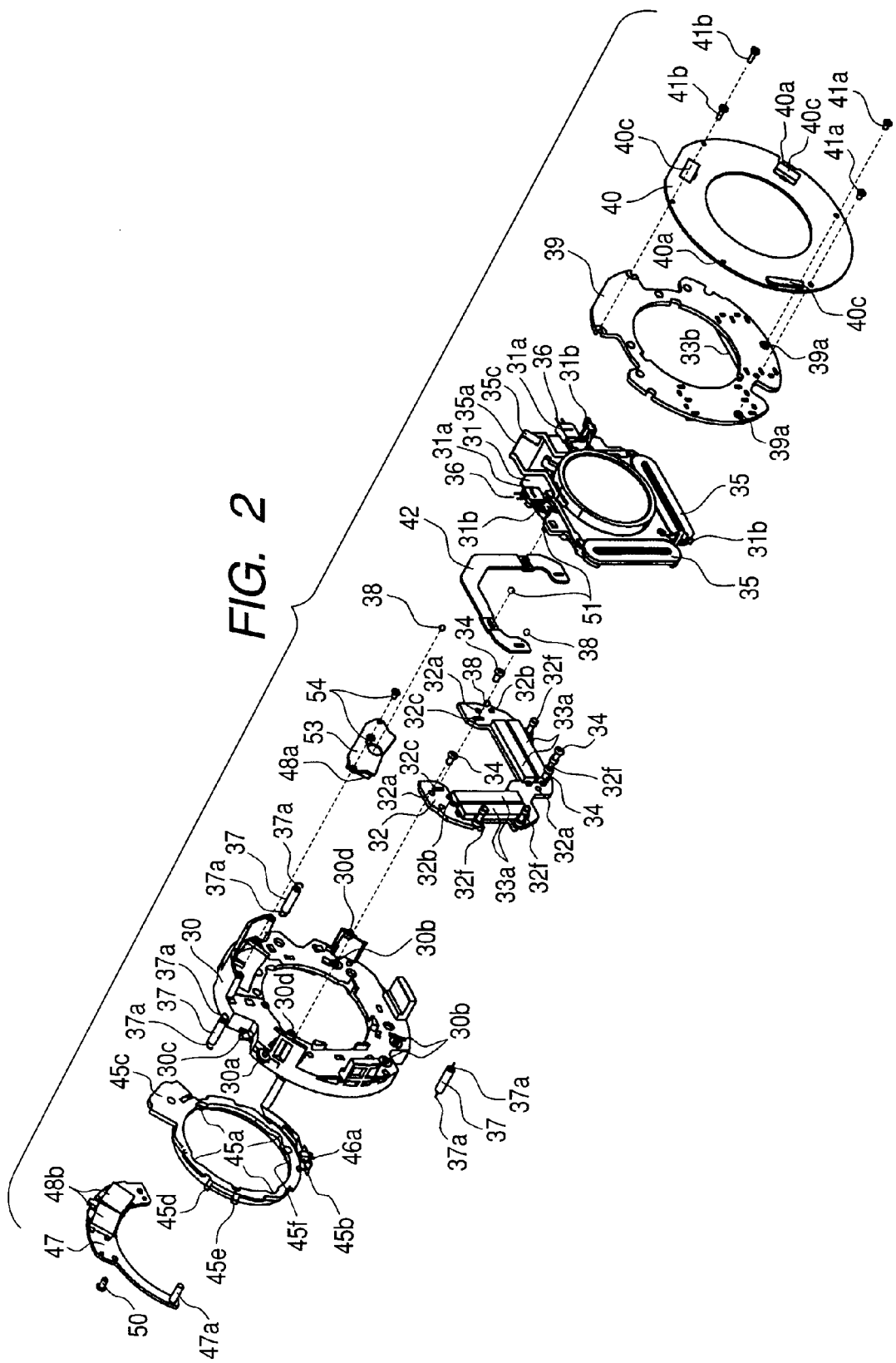
FIG. 2 is an exploded perspective view of an image stabilizing apparatus of FIG. 1.
Figure 3:
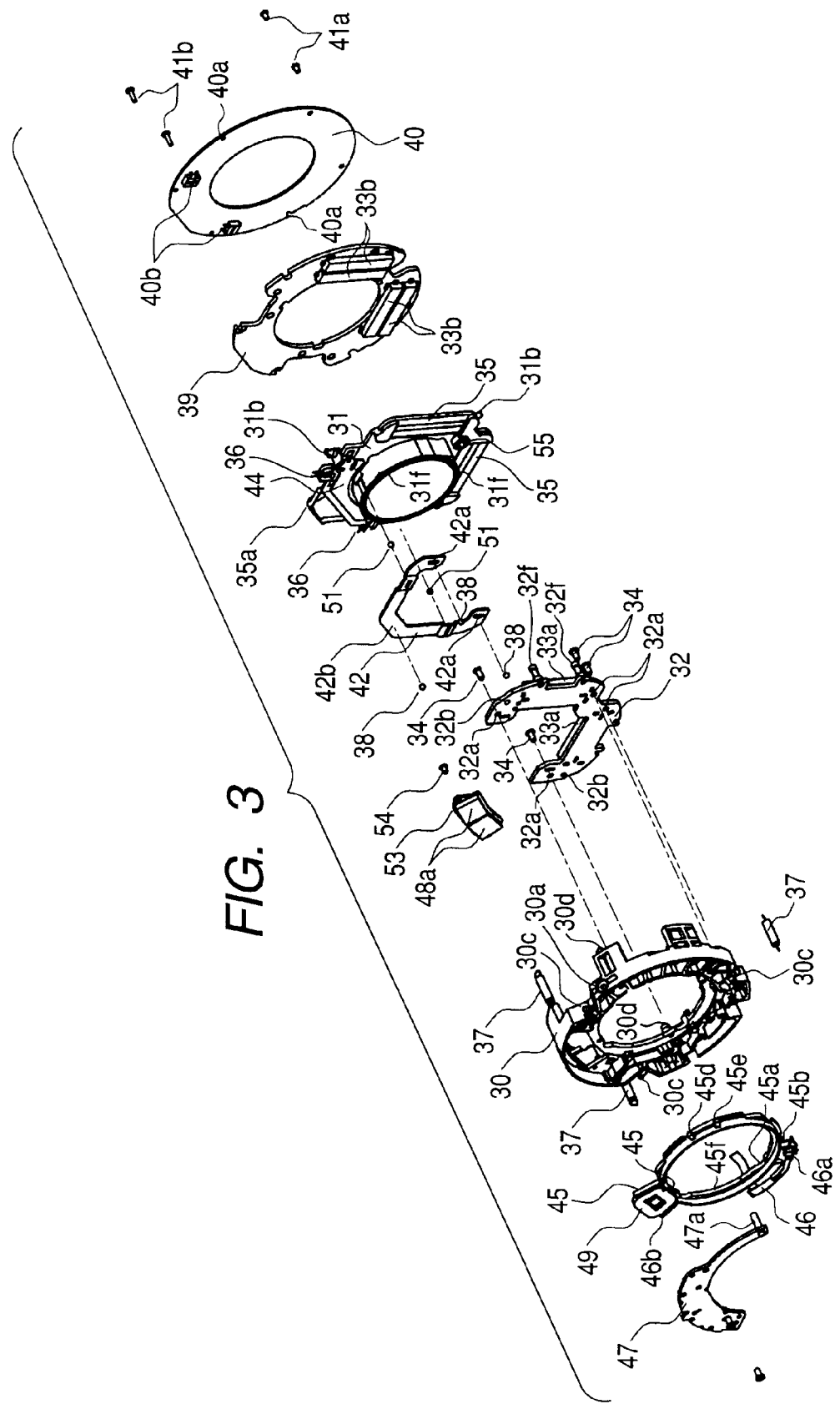
FIG. 3 is an exploded perspective view of the image stabilizing apparatus when viewed from a direction opposite to that of FIG. 2.
Figure 4:
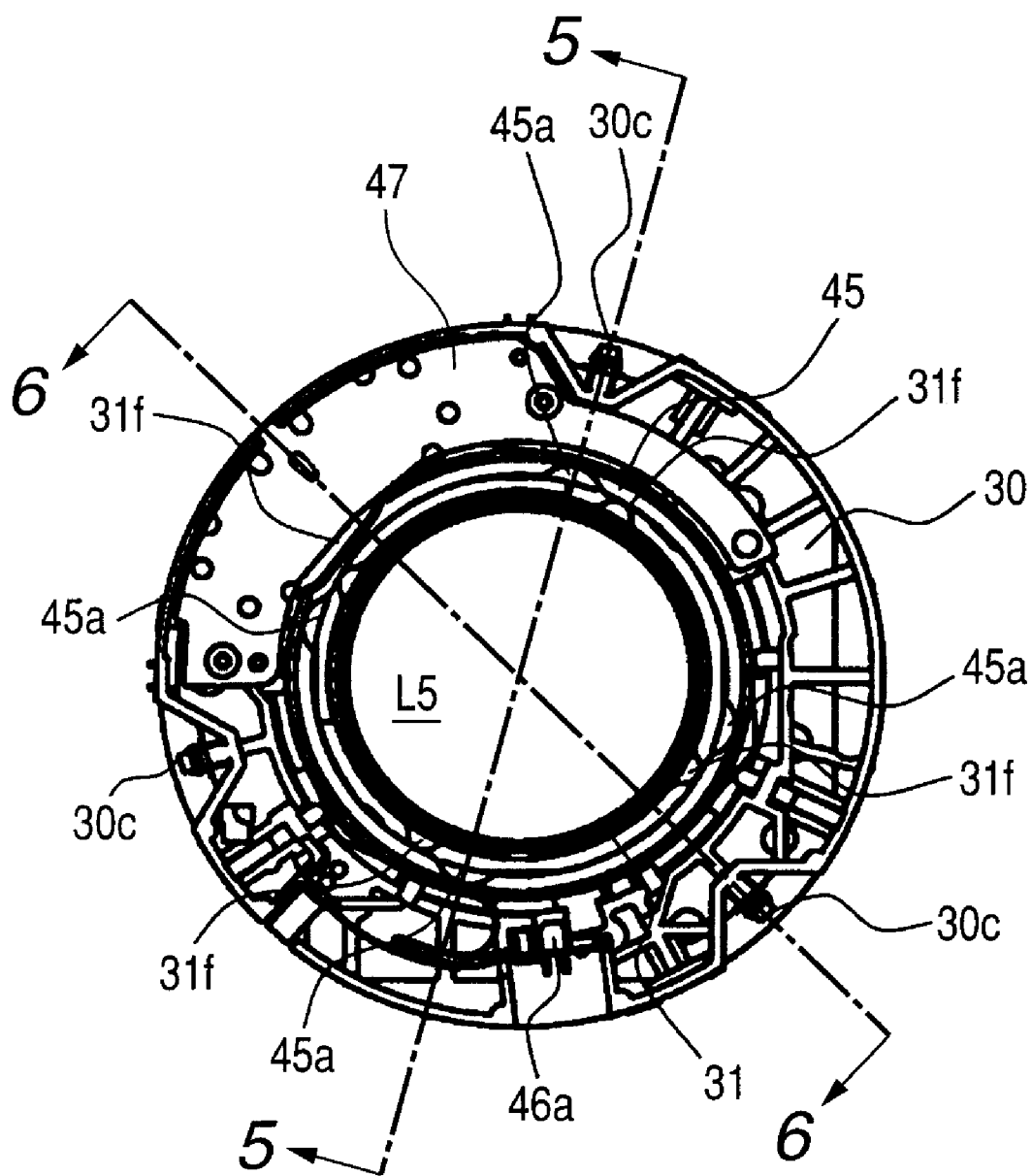
FIG. 4 is a front view of the image stabilizing apparatus of FIG. 1 when viewed from a side of a locking unit.
Figure 5:
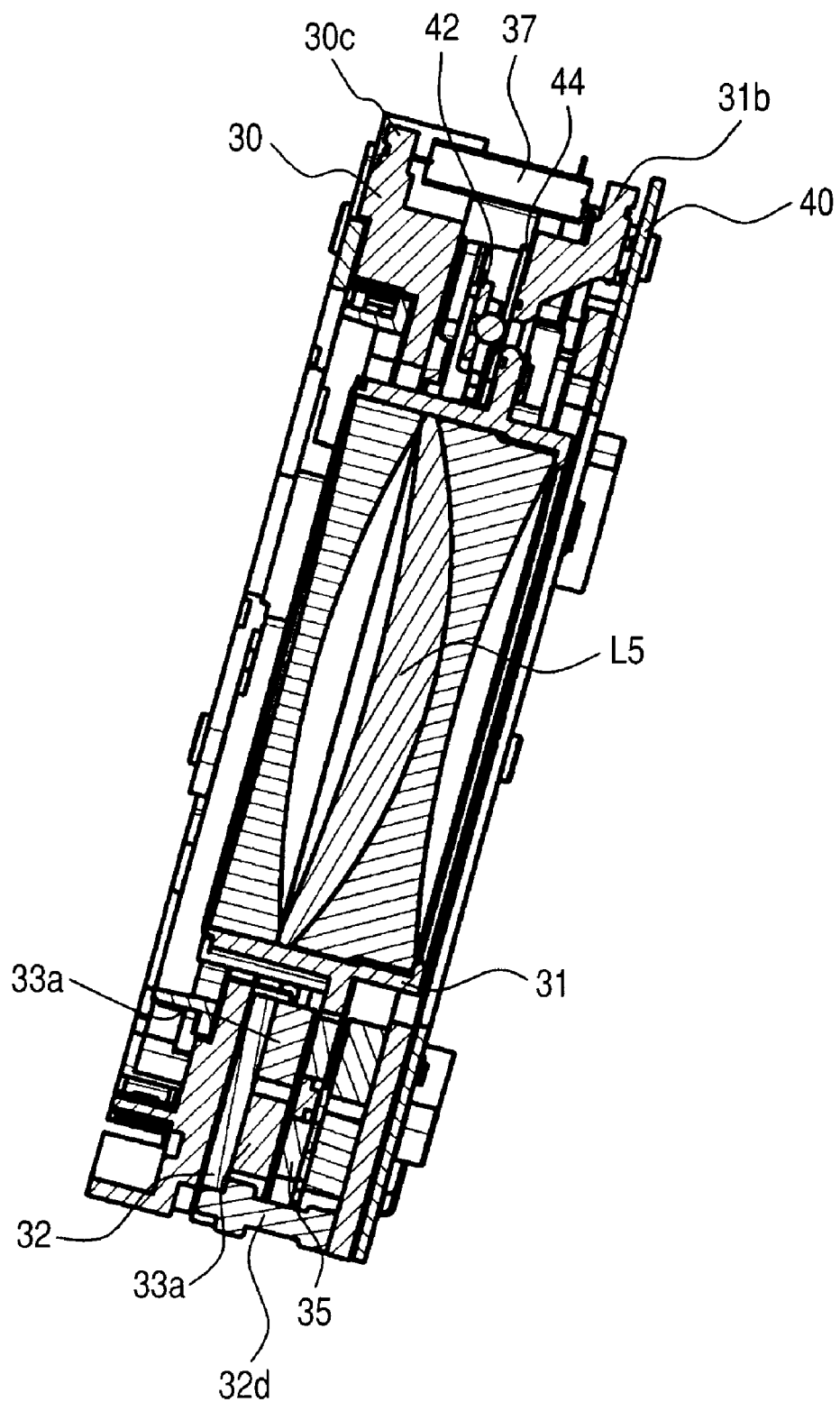
FIG. 5 is a sectional view taken along the line 5-5 of FIG. 4.
Figure 6:
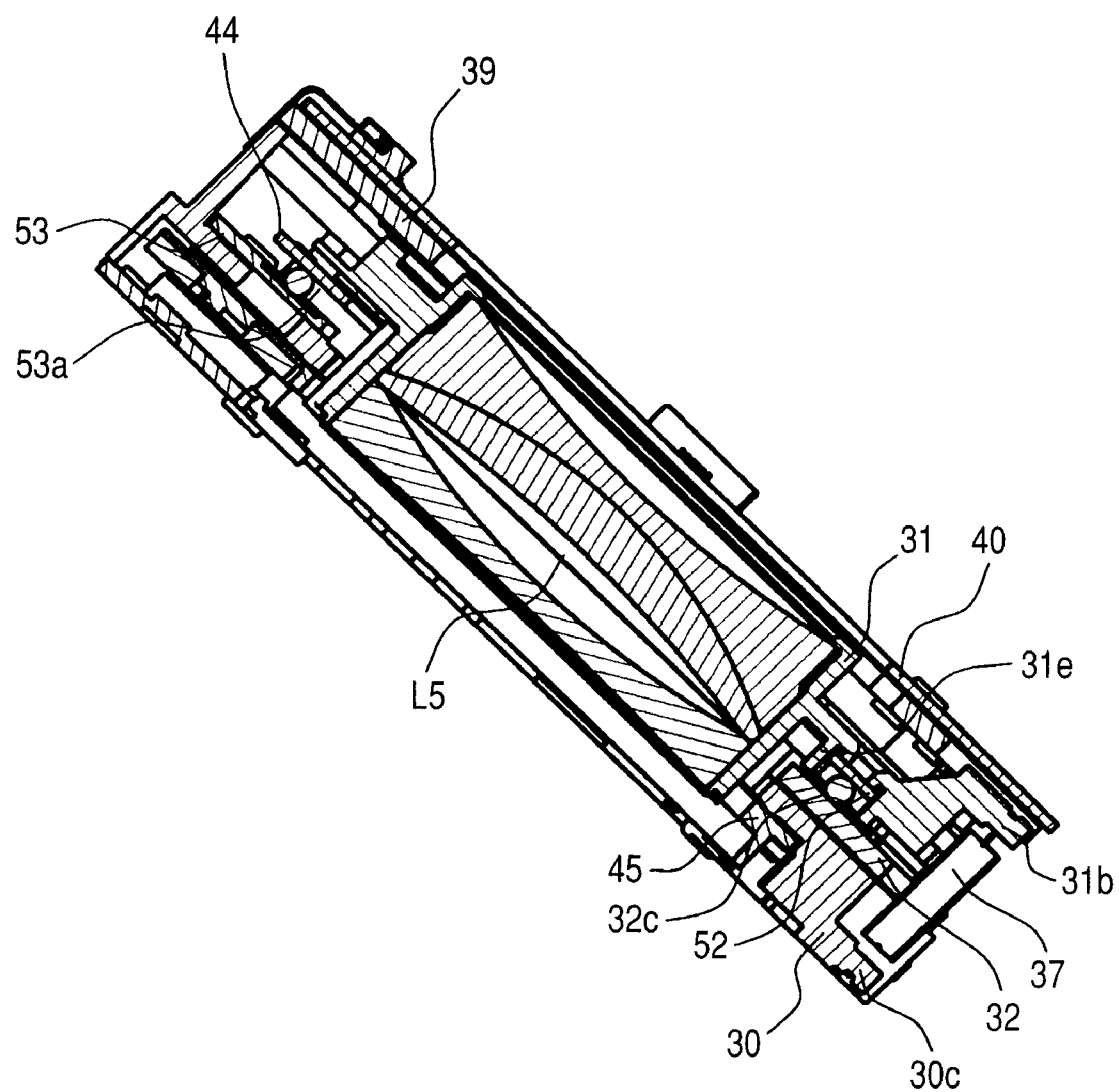
FIG. 6 is a sectional view taken along the line 6-6 of FIG. 4.
Figure 7:
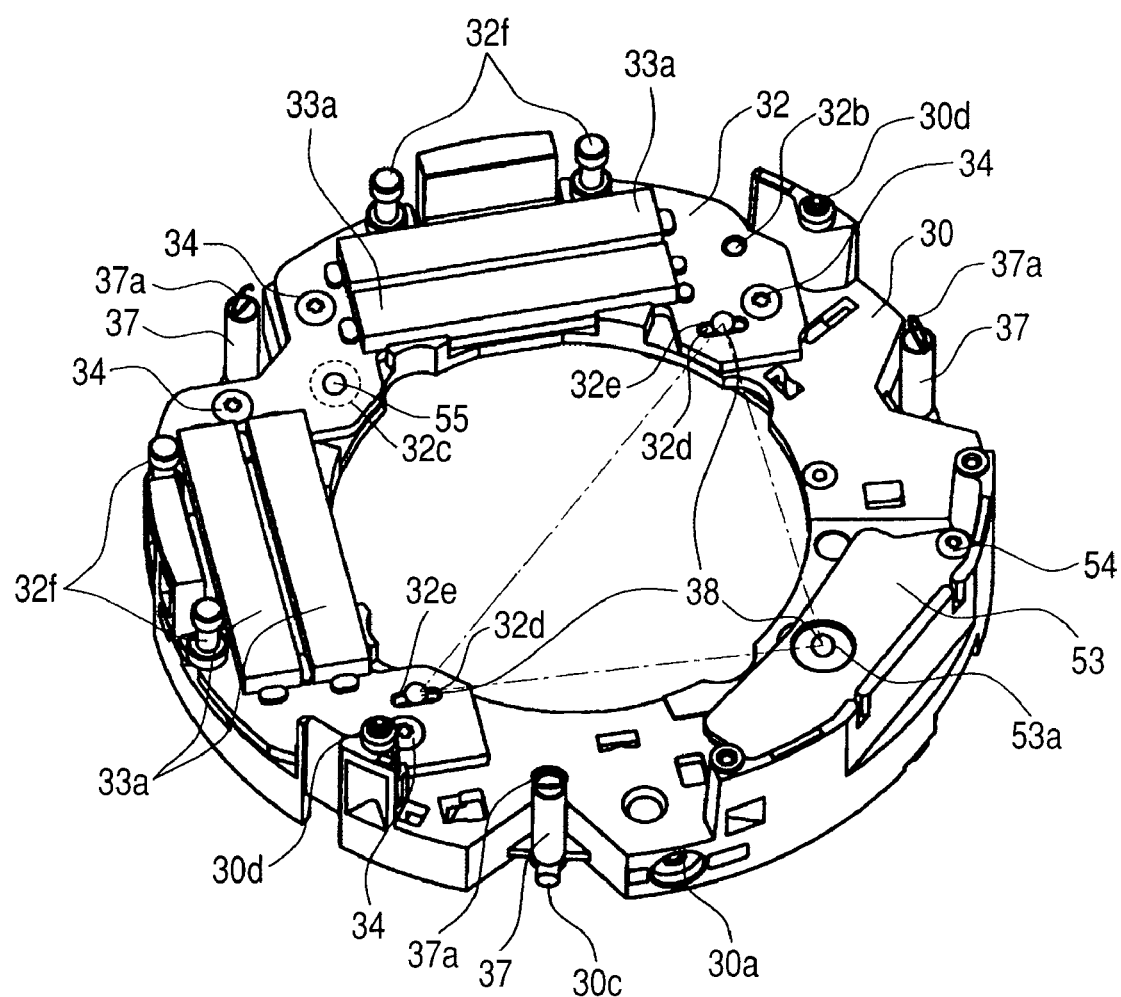
FIG. 7 is a perspective view of the image stabilizing apparatus.
Figure 8:
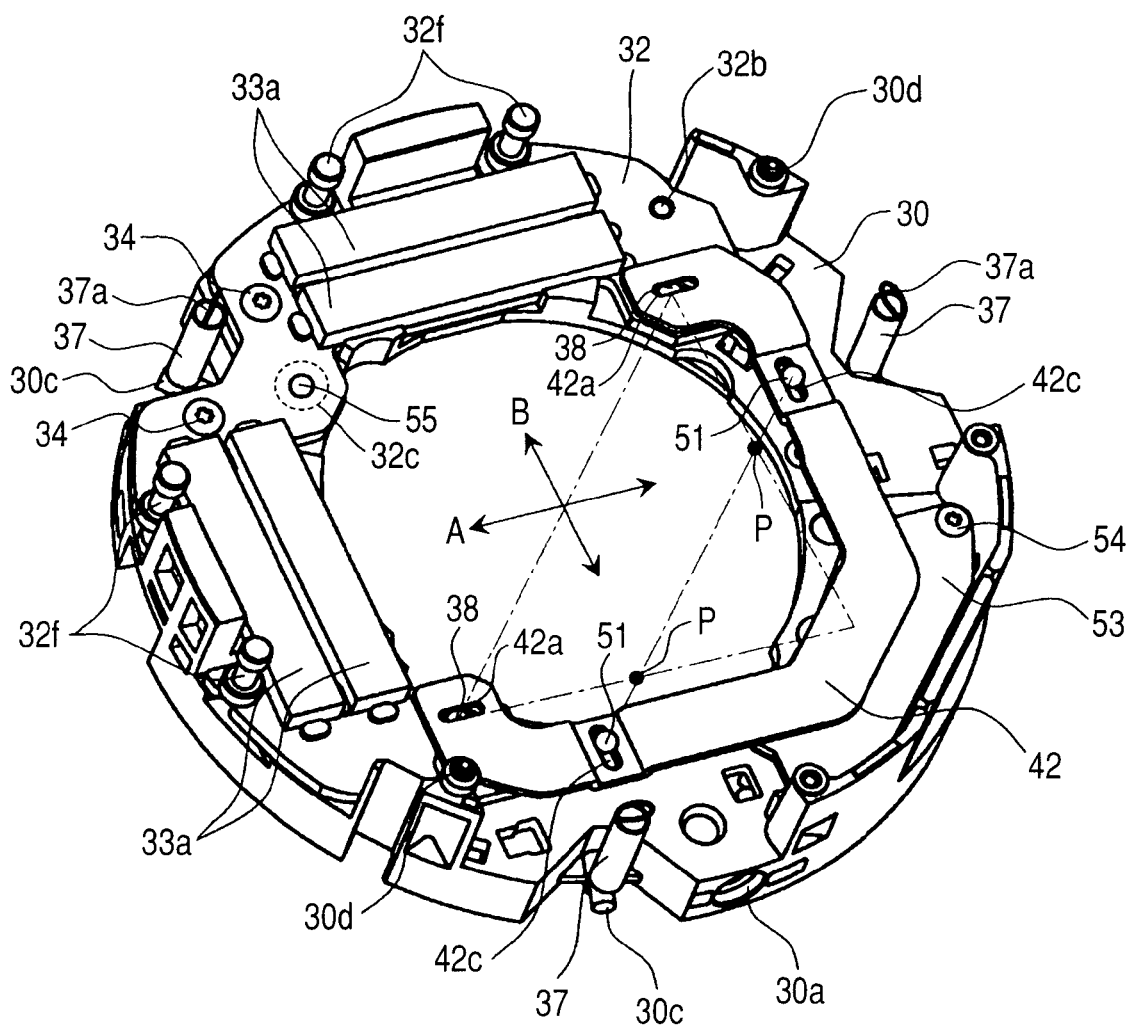
FIG. 8 is a perspective view of the image stabilizing apparatus.

Next, a configuration of the image stabilizing apparatus 12 is described in detail with reference to FIGS. 2 to 9. FIG. 2 is an exploded view of the image stabilizing apparatus 12 when viewed from a side of a shift board 40 in the image stabilizing apparatus 12. FIG. 3 is an exploded view of the image stabilizing apparatus 12 when viewed from a direction opposite to that of FIG. 2. FIG. 4 is a back view of the image stabilizing apparatus 12. FIG. 5 is a sectional view of the image stabilizing apparatus 12 taken along the line 5-5 of FIG. 4, and FIG. 6 is a sectional view of the image stabilizing apparatus 12 taken along the line 6-6 of FIG. 4. FIGS. 7 and 8 are views of a main part of the image stabilizing apparatus according to this embodiment. The same members are denoted by the same reference symbols.

As illustrated in FIGS. 2 and 3, on an outer periphery of a base plate 30 serving as the stationary part of the image stabilizing apparatus, a skid seat 30a is formed (actually, skid seats are provided equiangularly at three points along a rotating direction about the optical axis). A skid (not shown) is fixed to the skid seat 30a with a screw. When the skid is engaged in a hole portion formed in the fifth moving barrel 11, the image stabilizing apparatus 12 is held by the fifth moving barrel 11. Further, the skid is a so-called eccentric skid, and is shaped so that the engaged portion with the fifth moving barrel and the engaged portion with the skid seat 30a are eccentric to each other in terms of their center lines.

Therefore, when the eccentric skid is rotated, it is possible to appropriately adjust tilt of the entire image stabilizing apparatus 12 (tilt of the optical axis) with respect to the fifth moving barrel. Note that, the reason why holding through the eccentric skid is adopted is described below.

A first yoke 32 formed of a magnetic material is fixed into holes 30b of the base plate 30 with four screws 34 passing through holes 32a formed at four points in the first yoke 32, and integrally constitutes the stationary part of the image stabilizing apparatus 12. The first yoke 32 is positioned with holes 32b that are engaged to two convex portions (not shown). Further, two pairs of permanent magnets (shift magnets) 33a formed of four neodymium magnets are fixed by attraction on a front surface (shift frame side) of the first yoke 32.

The fifth lens unit L5 is an image stabilizing lens constituting an image stabilizing unit. As illustrated in FIG. 5 or the like, the fifth lens unit L5 includes three lenses in this embodiment.

The fifth lens unit L5 is held by a shift frame constituting the image stabilizing unit. Two shift coils 35 are fixed by adhesion on a front surface of the shift frame 31 so as to face the two pairs of permanent magnets 33a.

The shift frame 31 can be shifted relative to the base plate 30 in a pitch direction (A direction) and a yaw direction (B direction) perpendicular to the optical axis of the fifth lens unit L5, i.e., the optical axis of the image pickup optical system.

Further, two projection elements 36 such as infrared light-emitting diodes (iREDs) are fixed by adhesion on a back surface of the shift frame 31. The light beam projected from the projection elements 36 enters light receiving elements (hereinafter, referred to as shift position detection elements) 40b such as position sensitive detectors (PSDs) mounted on the shift board 40 through slits 31a formed in the shift frame 31. Two shift position detection elements 40b are provided correspondingly to the two projection elements 36. With this structure, it is possible to detect the position of the shift frame 31 in the pitch direction and the yaw direction.

An angular velocity signal output from the above-mentioned vibration sensor is integrated in the control circuit 23. Thus, an angular displacement signal is generated. Based on the angular displacement signal, the control circuit 23 sets, as a target shift position of the shift frame 31, a position to which a subject image is shifted by the same amount and in a reverse direction with respect to an amount/a direction by/in which the subject image to be rightfully generated in an image plane is displaced due to the angular displacement. The control circuit 23 determines an energizing direction and an energizing amount to the shift coils 35 so as to minimize a difference between the target shift position and the position of the shift frame 31 obtained by the shift position detection elements 40b. Then, the control circuit 23 energizes the shift coils 35. In this way, through performing feedback position control of the shift frame 31 (fifth lens unit L5), image blurs are reduced.

A connecting portion 35c of a shift flexible printed circuit (hereinafter, referred to as shift FPC) 35a is connected to a connector 40c mounted on the shift board 40. Thus, the shift coils 35 and the projection elements 36 soldered on the shift FPC 35a are energized from the shift board 40. Of the shift FPC 35a, between the connecting portion 35c and portions soldered to the projection elements 36, multiple folded portions are formed. Owing to elasticity of the folded portions and movement of the folded portions, the shift FPC 35a is not tensed even when the shift frame 31 is shifted.

The shift board 40 on which the shift position detection elements 40b, an output amplifying IC (not shown), and the connector 40c used for connection are mounted is brought into contact with a front surface of a second yoke 39. Positioning dowels 30d provided to the base plate 30 are inserted into two positioning holes 40a, and thus the shift board 40 is positioned together with the second yoke 39. The shift board 40 is integrated with the second yoke 39 through inserting two screws 41a into screw holes 39a of the second yoke 39, and is coupled with two screws 41b to the base plate 30 together with the second yoke 39, to thereby constitute the stationary part.

Two pairs of shift magnets 33b having the same shapes as those of the two pairs of shift magnets 33a fixed to the first yoke 32 are fixed by attraction to a back surface of the second yoke 39. Therefore, a closed magnetic circuit is formed by the first yoke 32, the shift magnets 33a, 33b, and the second yoke 39. The first yoke 32 and the second yoke 39 are attracted to each other by a magnetic attraction force. At this time, in order to prevent the yokes and the base plate 30 serving as the stationary part from being deformed due to the magnetic attraction force, four shafts 32f are arranged between the yokes. Further, when the shift coils 35 are energized in the magnetic circuit, the shift frame 31 is driven to shift in the pitch direction and the yaw direction.

That is, the first yoke 32, the shift magnets 33a, 33b, the second yoke 39, and the shift coils 35 constitute an electromagnetic actuator for causing the shift frame 31 to shift in the pitch direction and the yaw direction.

Next, there is described a rolling prevention structure portion constituting a guide unit, which is a main part of the present invention.

The rolling prevention structure mainly includes the first yoke 32, a first guide plate 42, a second guide plate 44, first rolling balls 38, second rolling balls 51, and a third rolling ball 55.

FIG. 7 illustrates a state, when viewed from the image side, in which the first yoke is assembled to the base plate 30 before assembly of the image stabilizing unit such as the shift frame 31. The first yoke 32 includes three abutting portions 32c, 32d against which the rolling balls abut. The third rolling ball 55 abuts against the abutting portion 32c located between the two pairs of magnets constituting the actuator, and the first rolling balls 38 abut against the two abutting portions 32d, respectively. The abutting portions 32d respectively include guide grooves 32e formed of elongated holes. The two first rolling balls 38 roll on the guide grooves 32e of the 32d, respectively.

A first lock yoke 53 is fixed to the base plate 30 with screws 54. The first lock yoke 53 includes an abutting surface 53a on a front surface thereof, and the rest first rolling ball 38 rolls on the abutting surface 53a.

FIG. 8 illustrates a state in which the first guide plate 42 is further assembled in the state illustrated in FIG. 7. The first guide plate 42 is a plate-like guide member, and abuts against the first rolling balls 38 at three abutting portions (two abutting portions 42a and one abutting portion 42b). Of the three abutting portions, the two abutting portions 42a respectively include guide grooves 42a formed of elongated holes that are formed in the same direction as the extending direction of the guide grooves 32e of the first yoke 32 on a back surface side of the first guide plate 42 illustrated in FIG. 8.

With this configuration, the three first rolling balls 38 are rollably interposed between the first guide plate 42, the first yoke 32, and the base plate 30. The two first rolling balls 38 are interposed between the guide grooves 32e of the first yoke 32 and the guide grooves 42a in which the longitudinal direction thereof extends in the same direction as that of the guide grooves 32e. Thus, the first guide plate 42 is allowed to move only in the longitudinal direction of the elongated holes (A direction in FIG. 8).

In the first guide plate 42, elongated holes are formed in a plane orthogonal to the optical axis so as to extend in a direction orthogonal to the guide grooves 42a. On the image plane side of the first guide plate 42 (side opposite to the base plate 30), two guide grooves 42c are formed to function as abutting portions against which the second rolling balls 51 abut. Note that, the first guide plate 42 is made of stainless steel being a nonmagnetic material, and hence actuation of the first guide plate 42 is not burdened with the attraction of the first guide plate 42 to the shift magnets 33a. Further, the first rolling balls 38, the second rolling balls 51, and the third rolling ball 55 are formed of ceramic balls, and hence can be assembled without being attracted to the shift magnets 33a during assembly, with the result that there is no burden during the actuation.

Further, the abutting portions, against which the respective rolling balls abut, are arranged and shifted so as not to be overlaid on each other in the optical axis direction, and hence total thicknesses in the optical axis direction after being assembled can be made smaller than the sum of thicknesses of the rolling balls and the guide plates. Thus, a reduction in thickness in the optical axis direction is achieved. In the present invention, steps are further formed between vicinities of the abutting portions 42a and vicinities of the guide grooves 42c serving as the front-side abutting portions of the first guide plate 42, and the surface of the first guide plate 42 in which the guide grooves 42c are formed is shifted toward the first rolling balls 38. Thus, the reduction in thickness in the optical axis direction is further achieved.

Figure 9:
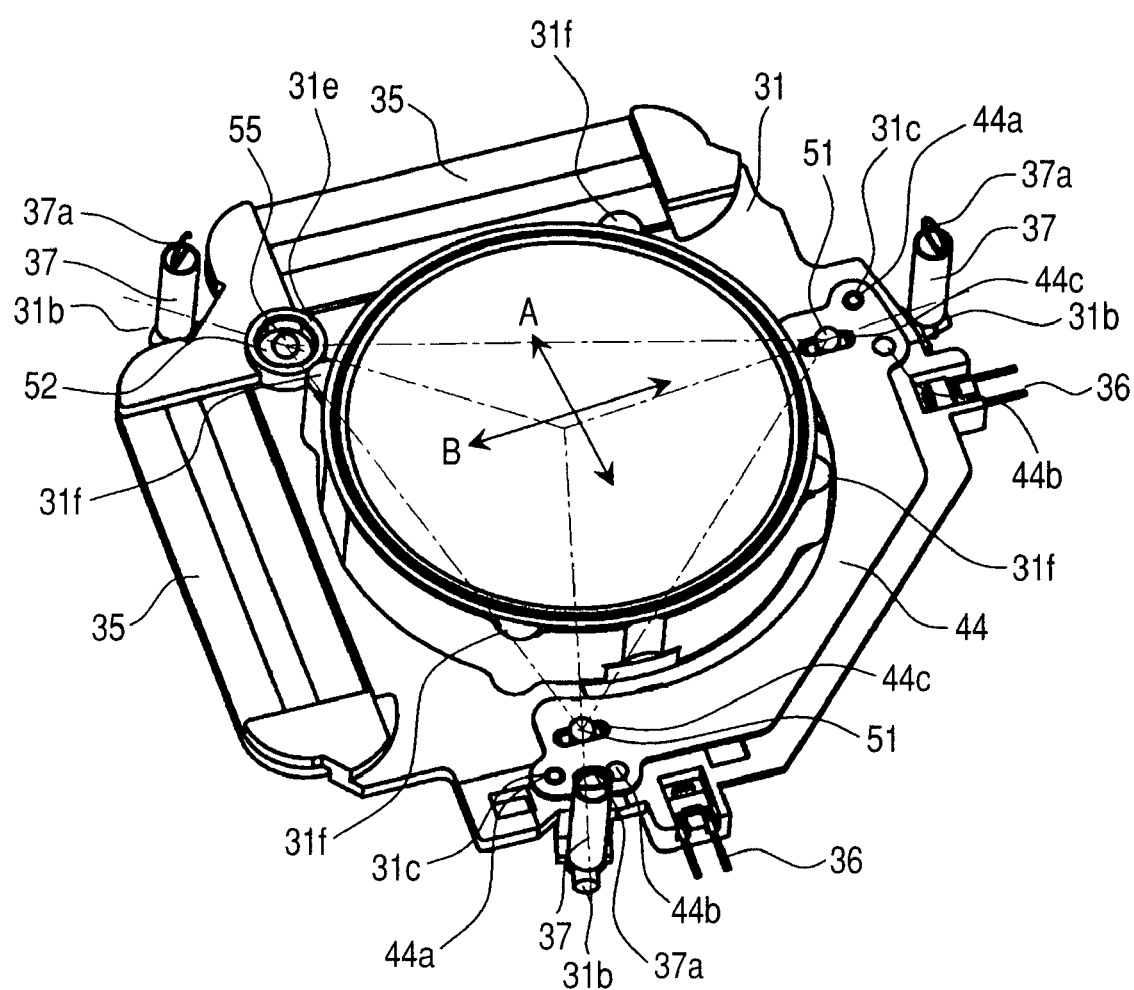
FIG. 9 is a perspective view of the image stabilizing apparatus.

FIG. 9 mainly illustrates the image stabilizing unit which is assembled in the apparatus of FIG. 8 in the midst of assembly. Note that, for easy understanding, a state in which the second rolling balls 51 and the third rolling ball 55 abut against the abutting portions is illustrated, and shift springs 37 are also illustrated.

Positioning dowels 31c are provided to the shift frame 31, and are inserted into holes 44a of the second guide plate 44 so as to function as positioning members. Further, the second guide plate 44 is fixed with screws into screw hole portions 44b from a back side of FIG. 9, to thereby be fixed integrally with the shift frame 31.

In the second guide plate 44, there are formed elongated holes in which the longitudinal direction thereof extends in a B direction. The second guide plate 44 includes two guide grooves 44c formed of the elongated holes. The guide grooves 44c function as abutting portions against which the second rolling balls 51 abut. The abutting portion, against which the third rolling ball 55 abuts, is constituted by a sub plate 52. The sub plate 52 is made of stainless steel, and is fixed to the shift frame 31 by adhesion.

A convex portion 31e serves as a wall for positioning the sub plate 52 and for preventing the third rolling ball 55 from slipping off.

As described above, in the present invention, portions against which the rolling balls abut are all made of metal. However, the portions may be made of a resin depending on the weight and the size of the optical system constituting the image stabilizing unit. When the image stabilizing unit illustrated in FIG. 9 is assembled in the state illustrated in FIG. 8, the shift frame 31 (image stabilizing unit) is supported on the two second rolling balls 51 through the second guide plate 44 and on the one third rolling ball 55 through the sub plate 52. In other words, the two second rolling balls 51 are rollably interposed between the first guide plate 42 and the second guide plate 44, and the one third rolling ball 55 is rollably interposed between the sub plate 52 and the first yoke 32. Further, the two second rolling balls 51 are interposed between the guide grooves 42c of the first guide plate 42 and the guide grooves 44c of the second guide plate 44 elongated in the B direction. Thus, the shift frame 31 fixing the second guide plate 44 is allowed to move only in the extending direction (B direction) of the elongated holes with respect to the first guide plate 42. That is, both of the third rolling ball 55 interposed between the abutting portion 32c and the sub plate 52, and the first rolling balls interposed between the abutting surface 53a and the abutting portion 42b are rollable in free directions. Accordingly, the first guide plate 42 and the shift frame 31 (second guide plate 44) move integrally in the A direction owing to rolling of the first rolling balls 38, and move in the B direction owing to rolling of the second rolling balls 51. In this way, the shift frame 31 can be shifted in a plane perpendicular to the optical axis without rotating in the plane perpendicular to the optical axis.

Note that, the embodiment in which the longitudinal direction (first direction) of each of the guide groove 42a and the guide groove 32e and the longitudinal direction (second direction) of each of the guide groove 42c and the guide groove 44c are orthogonal to each other is illustrated. However, the present invention is not limited thereto. It is only necessary that the longitudinal directions be different from each other in the plane perpendicular to the optical axis.

Figure 10:
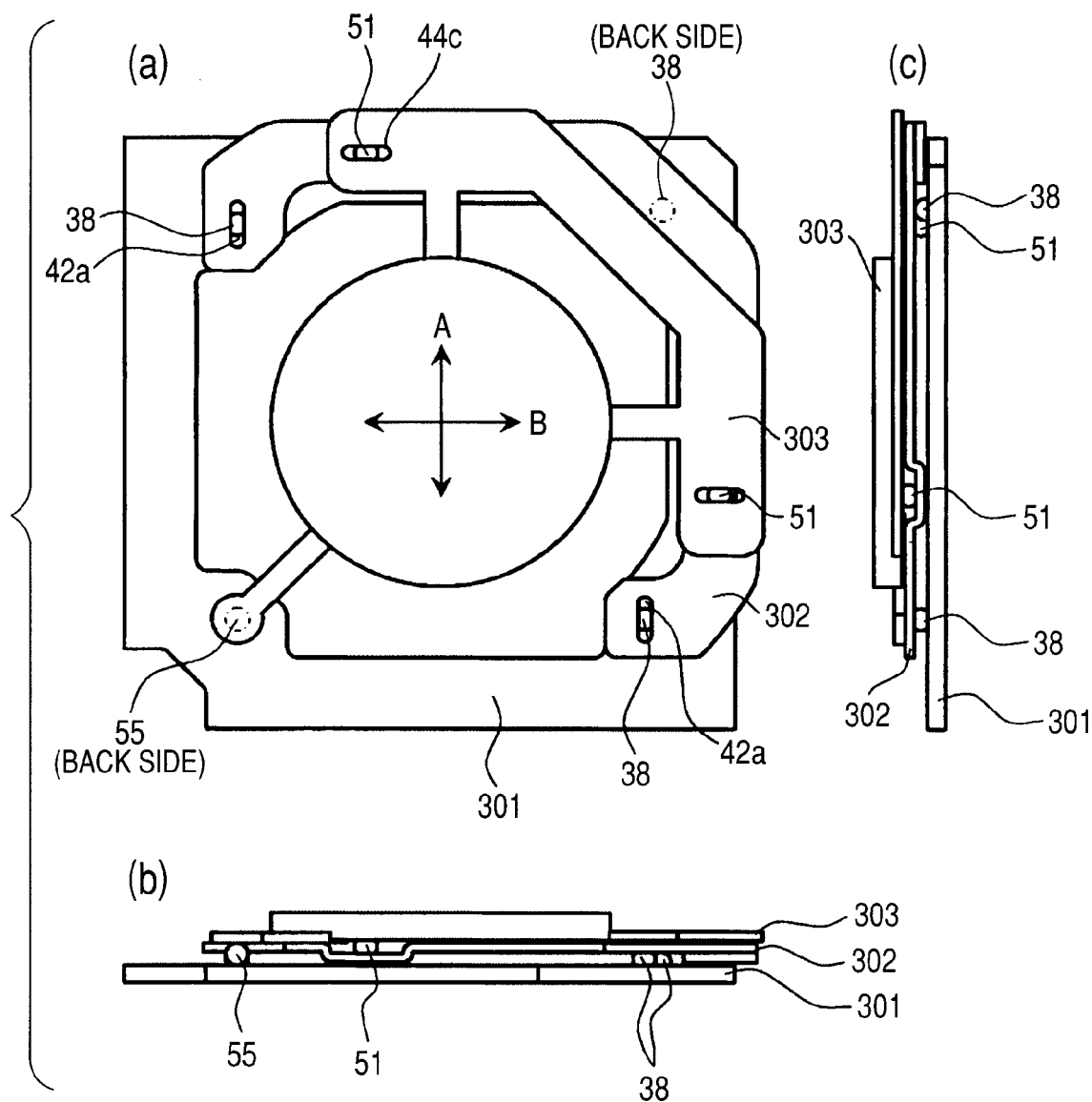
FIG. 10 is a schematic explanation view illustrating operation of the image stabilizing apparatus.
Figure 11:
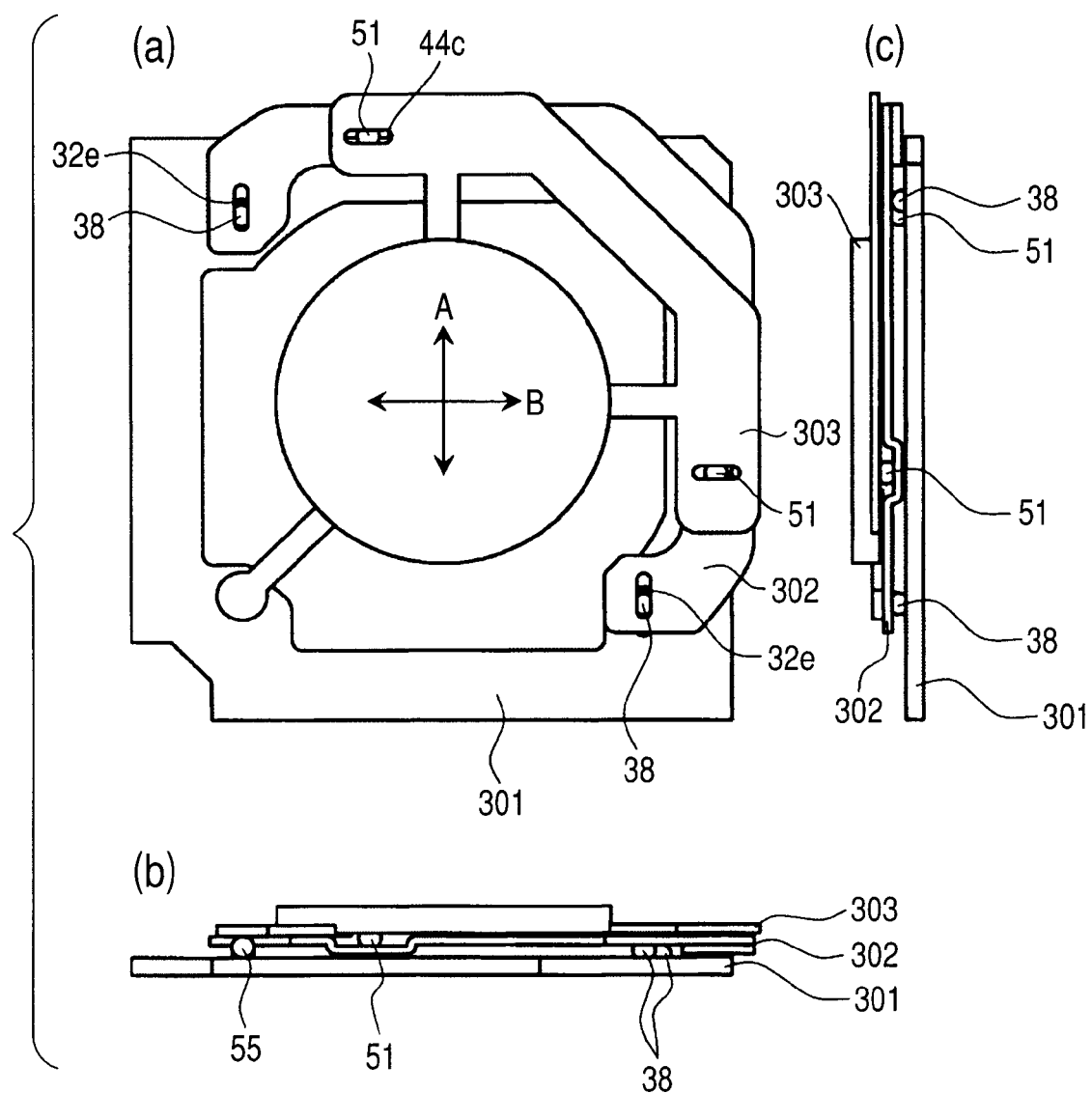
FIG. 11 is a schematic explanation view illustrating operation of the image stabilizing apparatus.
Figure 12:
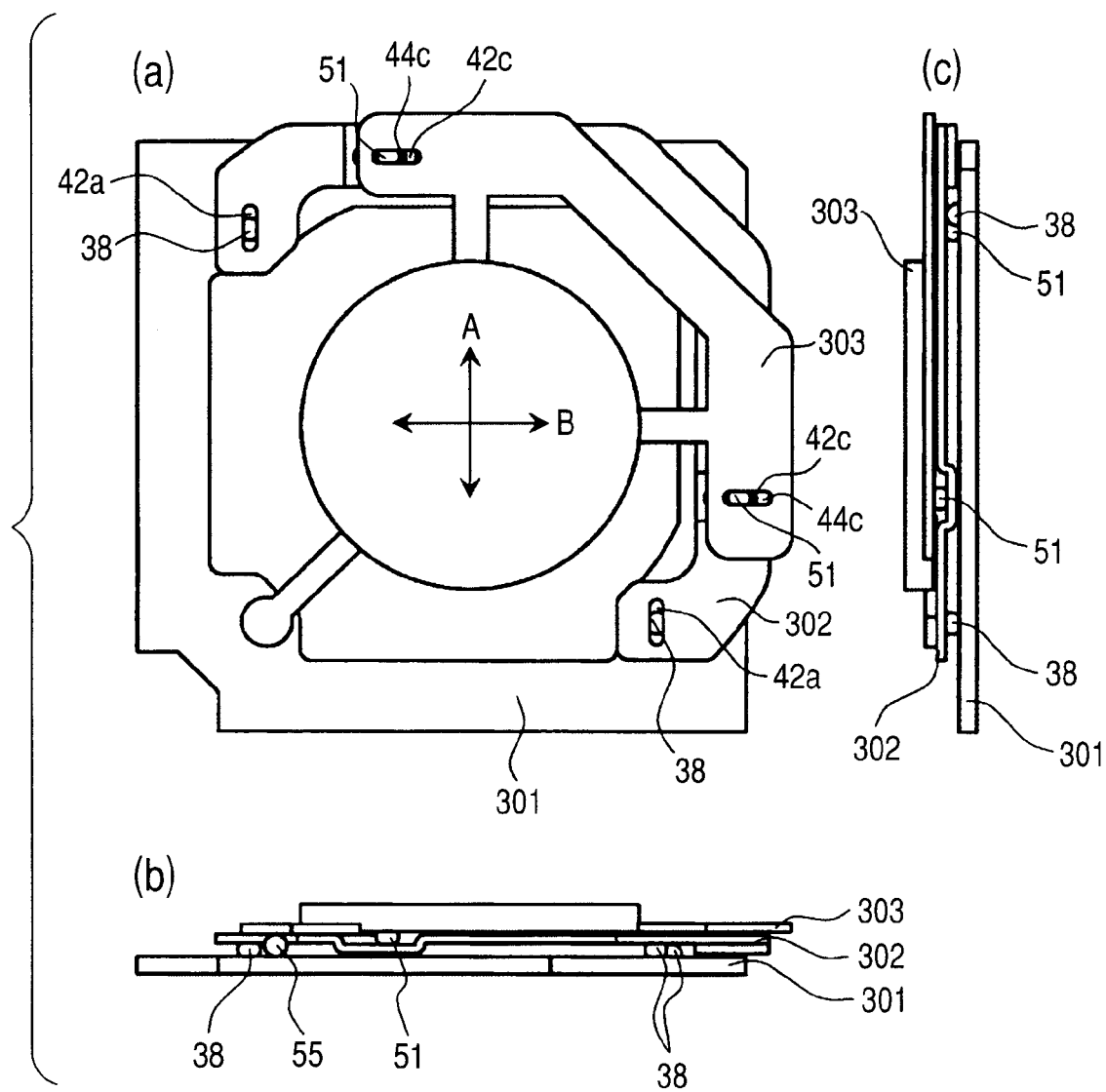
FIG. 12 is a schematic explanation view illustrating operation of the image stabilizing apparatus.

FIGS. 10, 11, and 12 schematically illustrate the above-mentioned configuration of the image stabilizing apparatus. With reference to FIGS. 10, 11, and 12, operation of the main part according to this embodiment is briefly described.

In FIG. 10, a portion (a) shows a front view illustrating a state in which the image stabilizing apparatus is not shifted, and portions (b) and (c) are side views illustrating the state. FIG. 10 schematically illustrates the configuration other than arrangement of the rolling balls 38, 51, and 55. A fixed component (fixed member) 301 corresponds to the first yoke 32, the first lock yoke 53, a second lock yoke 47, and the base plate 30 in the embodiment. A guide component 302 corresponds to the first guide plate 42. As a moving component (movable member) 303, the shift frame 31, the second guide plate 44, and the sub plate 52 are integrally illustrated. The fifth lens unit L5 is installed to the moving component 303.

A portion (a) of FIG. 11 is a view illustrating a state in which the image stabilizing apparatus is shifted upward at a maximum in the pitch direction (A direction), and portions (b) and (c) of FIG. 11 are side views similarly illustrating the state. A portion (a) of FIG. 12 is a view illustrating a state in which the image stabilizing apparatus is shifted to the right at a maximum in the yaw direction (B direction), and portions (b) and (c) of FIG. 12 are side views illustrating the state. Further, though the moving component 303 is always biased toward the fixed component 301, illustration thereof is omitted in FIGS. 10 to 12.

In the state in which the image stabilizing apparatus is not shifted, as illustrated in the portion (a) of FIG. 10, the rolling balls 38, 51, and 55 are located at the center positions of the guide grooves, respectively. During movement from this state to the state shown in (a) of FIG. 11 in which the image stabilizing apparatus is shifted upward at a maximum in the pitch direction (A direction), the two first rolling balls 38 roll along the guide grooves 32e and the guide grooves 42a formed to extend in the pitch direction (A direction). Therefore, the first rolling balls 38 move in the pitch direction (upward direction in FIGS. 10 to 12) by a half of a moving amount of the moving component 303. Two rolling balls that do not abut against the guide grooves, i.e., the third rolling ball 55 interposed between the fixed component 301 and the moving component 303 and the first rolling balls 38 interposed between the fixed component 301 and the guide component 302 roll similarly. The two second rolling balls 51, which abut against the guide grooves formed to extend in the yaw direction, are biased to the guide grooves by the shift springs 37. Thus, the two second rolling balls 51 are not allowed to roll in the pitch direction (A direction) but move in the A direction integrally with the guide component 302 and the moving component 303. Further, each of the first rolling balls 38, which has rolled, does not abut against each end portion in the extending direction of the guide groove even in the maximum shifted state, and hence no load fluctuation is generated owing to reliable rolling, which provides stability in control.

Next, during movement to the state in which the image stabilizing apparatus is shifted to the right at a maximum in the B direction shown in FIGS. 10 and 12, that is, during movement from the state illustrated in the portion (a) of FIG. 10 to the state illustrated in the portion (a) of FIG. 12, the two second rolling balls 51 roll along the guide grooves 42c and the guide grooves 44c formed to extend in the yaw direction. Therefore, the second rolling balls 51 move in the right direction in FIG. 12 by the half of the moving amount of the moving component 303. A third rolling ball 55 that does not abut against the guide groove, i.e., the third rolling ball 55 interposed between the fixed component 301 and the moving component 303 rolls similarly. The two first rolling balls 38, which abut against the guide grooves formed to extend in the pitch direction (A direction), are biased to the guide grooves 32e, 42a by the shift springs 37. Thus, the two first rolling balls 38 are not allowed to roll in the yaw direction (B direction), and are retained at the center positions of the guide grooves as they are. Further, each of the second rolling balls 51, which has rolled, does not abut against each end portion in the extending direction of the guide groove even in the maximum shifted state, and hence no load fluctuation is generated owing to reliable rolling, which provides stability in control.

Through controlling the above-mentioned relations in the pitch direction and the yaw direction, all of the moving portions are configured to be rollably retained without causing load fluctuation and without rotating (rolling).

Further, a length of each of the guide grooves 32e, 42a, 42c, and 44c in this embodiment is set to be larger by a predetermined amount than a rolling amount of each rolling ball. With this setting, there is eliminated a risk that the rolling ball hits against the end portion in the longitudinal direction of the guide groove at an end in a moving direction (end in the longitudinal direction of the groove) and thus the actuation is affected. Similarly, a step of the abutting surface 53a on which the rolling ball freely rolls, and a distance up to the wall of the convex portion 31e are each set to have a range larger by a predetermined amount than the moving amount in actual rolling of the rolling ball. In this embodiment, about twice as large range as the moving amount in actual rolling of the rolling ball is secured for each of the step of the abutting surface 53a and the distance up to the wall of the convex portion 31e. Protrusions 31b are formed at three points on an outer periphery of the shift frame 31. Further, protrusions 30c are formed also on the base plate 30 at three points corresponding to the three protrusions 31b. Further, as illustrated in FIG. 5 or the like, both ends 37a of each of the shift springs 37 are hooked to the protrusion 31b and the protrusion 30c, respectively. In this way, the shift springs 37 are arranged at substantially equal intervals in an angular direction, and hence the shift frame 31 is always biased toward the base plate 30 with good balance. Further, in order to support the shift frame 31 itself with good balance without rattling when the shift frame 31 is shifted, the abutting portions, against which the second rolling balls 51 and the third rolling ball 55 abut, are provided at substantially the same positions as those of the shift springs 37 in the rotating direction about the optical axis.

Note that, the guide grooves 42c of the first guide plate 42, against which the second rolling balls 51 abut, are provided between the abutting portions 42a and the abutting portion 42b of the first guide plate against which the three first rolling balls 38 abut. When projected onto the plane perpendicular to the optical axis, a line connecting the guide grooves 42c intersects at two points P with respect to a triangle formed by connecting the abutting portions 42a, 42b. The first guide plate 42 receives a biasing force applied by the shift springs 37 toward the base plate 30 only at two points through the two second rolling balls 51 in the guide grooves 42c. With this configuration, it is possible to movably support the shift frame 31 with good balance without rattling.

Further, the shift frame 31 is positioned at a certain point in the optical axis direction with respect to the first yoke serving as the stationary part not through the first guide plate 42 but through the third rolling ball 55, and hence it is possible to reduce the number of components, and to suppress fluctuation in position in the optical axis direction.

However, the shift frame 31 is supported at two points by the stationary part through the first guide plate 42 and the second guide plate 44. Each of the positions of the two points in the optical axis direction can be adjusted by a tilt adjusting mechanism by means of the above-mentioned eccentric skid arranged in the skid seat 30a in a vicinity of the abutting portion 42c against which the second rolling ball abuts through rotating the eccentric skid, and thus it is possible to adjust the tilt of the image stabilizing unit.

Note that, the tilt adjusting method is not limited to a method through the eccentric skid.

Lock magnets 48a are fixed by attraction to the first lock yoke 53 to be fixed to the base plate 30. A lock ring 45 serving as a lock member is held by an inner peripheral portion of the base plate 30 to be rotatable about the optical axis. Lock cam portions 45a are formed at four points on an inner peripheral portion of the lock ring 45.

On an outer peripheral surface of a cylindrical portion of the shift frame 31 for holding the fifth lens unit L5, protruding portions 31f are formed at four points which correspond to the positions of the lock cam portions 45a in the rotating direction about the optical axis in a state in which the lock ring 45 is rotated to an unlock position described below. In a state in which the positions of the lock cam portions 45a of the lock ring 45 are displaced with respect to the positions of the protruding portions 31f of the shift frame 31 in the rotating direction about the optical axis, the protruding portions 31f abut against (engage) or come close to an inner peripheral surface 45f of the lock ring 45. Thus, shifting of the shift frame 31 in the pitch direction and the yaw direction is restricted. This state is referred to as a lock state, and the position in the rotating direction of the lock ring 45 in this state is referred to as a lock position.

Further, in a state in which a rotation angle of the lock cam portions 45a of the lock ring 45 corresponds to a rotation angle of the protruding portions 31f of the shift frame 31, the protruding portions 31f are located inside the lock cam portions 45a at predetermined distances from the lock cam portions 45a. Accordingly, shifting of the shift frame 31 in the pitch direction and the yaw direction is allowed. This state is referred to as an unlock state, and the rotating position of the lock ring 45 in this state is referred to as an unlock position (lock releasing position).

A lock coil 49 is fixed by adhesion onto a back surface of a flat surface portion 45c of the lock ring 45. An end portion of a coil wire of the lock coil 49 is soldered to an exposed portion 46b of a lock flexible printed circuit (lock FPC) 46 bonded to an outer periphery of the lock ring 45.

On the lock FPC 46, there is mounted a photointerrupter 46a serving as a detector for detecting the rotating position of the lock ring 45. A light shielding portion 45b formed in the lock ring 45 passes through between a projection portion and a light receiving portion of the photointerrupter 46a, and thus the photointerrupter 46a is switched from a light shielding state to a light receiving state. Consequently, the photointerrupter 46a detects the rotating position (lock position and unlock position) of the lock ring 45.

In this embodiment, all signals output from the photointerrupter 46a in the cases of the lock position and the unlock position are bright signals (signals output when the light receiving portion receives light). Thus, the control circuit 23 determines whether the lock ring 45 is located at the lock position or the unlock position based on signals from the shift position detection elements 40b for detecting the shift position of the shift frame 31. For example, in a case where the signals from the shift position detection elements 40b indicate that the shift frame 31 is located in the vicinity of the optical axis of the image pickup optical system in a state in which a bright signal is output from the photointerrupter 46a, the control circuit 23 determines that the lock ring 45 is located at the lock position. In a case where the signals from the shift position detection elements 40b indicate that the shift frame 31 is located away from the optical axis of the image pickup optical system, the control circuit 23 determines that the lock ring 45 is located at the unlock position.

Note that, the lock FPC 46 is provided with a U-turn portion 46d capable of being elastically deformed along with the rotation of the lock ring 45. With this configuration, the lock FPC 46 is prevented from being tensed.

A lock rubber (elastic member) 47a prevents the lock ring 45 from rotating beyond the lock position and beyond the unlock position.

Lock magnets 48b are fixed by attraction to a front surface of the second lock yoke 47. A closed magnetic circuit is formed by the first lock yoke 53, the lock magnets 48a, the second lock yoke 47, and the lock magnets 48b, and magnetic coupling is obtained. When the lock coil 49 is energized in the magnetic circuit, the lock ring 45 can be rotated between the lock position and the unlock position.

The first lock yoke 53, the lock magnets 48a, the second lock yoke 47, the lock magnets 48b, and the lock coil 49 constitute an electromagnetic actuator for rotating the lock ring 45.

Even when protrusions 45d, 45e of the lock ring 45, which is driven to rotate through energizing the lock coil 49, hit against the lock rubber 47a, the lock rubber 47a is formed of an elastic member (rubber), and hence collision sound is barely audible.

Further, in a state in which the lock ring 45 is being rotating between the lock position and the unlock position (hereinafter, this state is referred to as mid-rotation state), the light shielding portion 45b of the lock ring 45 is located between the projection portion and the light receiving portion of the photointerrupter 46a, and blocks the light travelling from the projection portion to the light receiving portion. In a case where the photointerrupter 46a detects that the lock ring 45 stops in the mid-rotation state due to disturbance or the like, the control circuit 23 performs energization on the lock coil 49 so that the lock ring 45 is rotated again in the same direction as the rotating direction until just before stopping. The rotating direction until just before stopping may be stored in a memory in the control circuit 23.

Further, in view of prevention of malfunction, in a case where the lock ring 45 stops in the mid-rotation state, the lock ring 45 may be rotated again to the lock position irrespective of the rotating direction until just before stopping.

With the above-mentioned configuration, each of the rolling balls is allowed to roll without slipping, and hence it is possible to move the shift frame 31 serving as the image stabilizing unit with less frictional resistance, and to improve driving responsibility and image stabilizing performance.

Further, the image stabilizing unit itself is biased, and hence no rattling occurs during shift movement. Thus, it is possible to reduce occurrence of vibration and noise. Further, the shift springs 37 serving as biasing units are arranged at positions at which the shift springs 37 are overlaid in the optical axis direction on the above-mentioned members constituting the rolling prevention structure, and hence it is possible to provide the image stabilizing apparatus with a compact configuration in the optical axis direction.

Note that, in this embodiment, a so-called moving-coil type image stabilizing apparatus is described, in which the shift frame 31 is provided with the shift coils 35 and the base plate 30 (first yoke 32 and second yoke 39) is provided with the shift magnets 33a, 33b. However, the present invention is not limited to the above-mentioned configuration, and is applicable even in a case of using of a so-called moving-magnet type image stabilizing apparatus in which the shift frame 31 is provided with shift magnets and the base plate 30 is provided with shift coils. In other words, one of the shift frame 31 and the base plate 30 may be provided with a coil, and the other of the shift frame 31 and the base plate 30 may be provided with a magnet.

Further, in this embodiment, the coil spring is used as the biasing unit for the shift frame 31. However, the shift frame 31 may be biased with use of an elastic member, such as a rubber, serving as another biasing unit or with use of magnetic attraction/magnetic repulsion of a magnet. Also in a case of using the coil spring, a configuration other than the configuration in this embodiment may be adopted as long as the same effect as that of this embodiment is obtained.

In this embodiment, as the configuration in which the rolling ball is allowed to roll only in one direction, the guide groove formed of the elongated hole is exemplified. However, the present invention is not limited thereto. It should be noted that the same effect as that of this embodiment can be obtained if a guide is formed of a V-shaped groove, a C-shaped groove, or the like and is configured so as not to allow the rolling ball to freely roll in a direction other than one direction (guide against which the rolling ball abuts only at two points).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-165538, filed on Jul. 14, 2009, which is hereby incorporated by reference herein in its entirety.

What is claimed is:

1. An image stabilizing apparatus, comprising:
    an image stabilizing lens;
    a movable member that holds the image stabilizing lens and is movable with respect to a fixed member in a plane perpendicular to an optical axis;
    a guide member that is movable with respect to the fixed member in a plane perpendicular to an optical axis and guides the movable member to prevent the movable member from rotating in the plane perpendicular to the optical axis;
    a plurality of first rolling balls rollably interposed between the fixed member and the guide member;
    a plurality of second rolling balls rollably interposed between the guide member and the movable member;
    a third rolling ball rollably interposed between the fixed member and the movable member; and
    a drive unit that drives the movable member with respect to the fixed member perpendicularly to the optical axis,
    wherein:
    the plurality of first rolling balls are rollable only in a first direction perpendicular to the optical axis;
    the plurality of second rolling balls is rollable only in a second direction that is perpendicular to the optical axis and is different from the first direction;
    the third rolling ball is freely movable perpendicularly to the optical axis; and
    the third rolling ball and the first rolling balls overlap each other at least in a portion when viewed from a direction perpendicular to the optical axis.

2. An image stabilizing apparatus according to claim 1, wherein the third rolling ball is disposed so that the position of the third rolling ball in the optical axis direction is overlapped with positions of the second rolling balls in the optical axis direction.

3. An image stabilizing apparatus according to claim 2, wherein:
    number of the plurality of first rolling balls is three, number of the plurality of second rolling balls is two and number of the third rolling ball is one;
    two of the three first rolling balls are rollable only in a first direction perpendicular to the optical axis; and
    a projection, onto a plane perpendicular to the optical axis, of a line connecting portions at which the two second rolling balls abut against the guide member and a projection, onto the plane, of a triangle formed by connecting portions at which the three first rolling balls abut against the guide member, intersect each other at two points.

4. An image stabilizing apparatus according to claim 1, wherein in a state projected on a plane perpendicular to the optical axis, the first, second and third rolling balls are disposed in a rotating direction about the optical axis in the following order:
    a first ball of the three first rolling balls;
    a first ball of the two second rolling balls;
    a second ball of the three first rolling balls;
    the third rolling ball;
    a third ball of the three first rolling balls; and
    a second ball of the two second rolling balls.

5. An optical apparatus, comprising the image stabilizing apparatus according to claim 1.

6. An image stabilizing apparatus according to claim 1, the second rolling balls being disposed so that the positions of the second rolling balls in the optical axis direction are overlapped with positions of the first rolling balls in the optical axis direction.

7. An image stabilizing apparatus, comprising:
    an image stabilizing lens;
    a movable member that holds the image stabilizing lens and is movable with respect to a fixed member in a plane perpendicular to an optical axis;
    a guide member that is movable with respect to the fixed member in a plane perpendicular to an optical axis and guides the movable member to prevent the movable member from rotating in the plane perpendicular to the optical axis;
    a plurality of first rolling balls rollably interposed between the fixed member and the guide member;
    a plurality of second rolling balls rollably interposed between the guide member and the movable member;
    a third rolling ball rollably interposed between the fixed member and the movable member; and
    a drive unit that drives the movable member with respect to the fixed member perpendicularly to the optical axis,
    wherein:
    movement of the plurality of first rolling balls is restricted in a first direction perpendicular to the optical axis; and
    movement of the plurality of second rolling balls is restricted in a second direction that is perpendicular to the optical axis and is different from the first direction;
    the third rolling ball is freely movable perpendicularly to the optical axis; and
    the third rolling ball and the first rolling balls overlap each other at least in a portion when viewed from a direction perpendicular to the optical axis.

8. An image stabilizing apparatus according to claim 7, wherein the third rolling ball is disposed so that the position of the third rolling ball in the optical axis direction is overlapped with positions of the second rolling balls in the optical axis direction.

9. An image stabilizing apparatus according to claim 8, wherein:
    number of the plurality of first rolling balls is three, number of the plurality of second rolling balls is two and number of the third rolling ball is one;

two of the three first rolling balls are rollable only in a first direction perpendicular to the optical axis; and a projection, onto a plane perpendicular to the optical axis, of a line connecting portions at which the two second rolling balls abut against the guide member and a projection, onto the plane, of a triangle formed by connecting portions at which the three first rolling balls abut against the guide member, intersect each other at two points.

10. An image stabilizing apparatus according to claim 7, wherein in a state projected on a plane perpendicular to the optical axis, the first, second and third rolling balls are disposed in a rotating direction about the optical axis in the following order:

a first ball of the three first rolling balls;
a first ball of the two second rolling balls;
a second ball of the three first rolling balls;
the third rolling ball;
a third ball of the three first rolling balls; and
a second ball of the two second rolling balls.

11. An optical apparatus, comprising the image stabilizing apparatus according to claim 7.

12. An image stabilizing apparatus according to claim 7, the second rolling balls being disposed so that the position of the second rolling balls in the optical axis direction are overlapped with positions of the first rolling balls in the optical axis direction.

* * * * *